INVENTORS
Robert H. Morris
And
Charles L. Pillmore
BY
ATTORNEY

Nov. 22, 1960

R. H. MORRIS ET AL 2,960,771

EXAGGERATION PROFILE PLOTTER

Filed April 14, 1958

INVENTORS
Robert H. Morris
And
Charles L. Pillmore

BY *Donald G. Welsh*

ATTORNEY

United States Patent Office 2,960,771
Patented Nov. 22, 1960

2,960,771

EXAGGERATION PROFILE PLOTTER

Robert H. Morris, Golden, and Charles L. Pillmore, Denver, Colo., assignors to the United States of America as represented by the Secretary of the Interior Filed Apr. 14, 1958, Ser. No. 728,499

3 Claims. (Cl. 33—20)

(Granted under Title 35, U.S. Code (1952), sec. 266)

The invention herein described and claimed may be manufactured and used by or for the Government of the United States of America for governmental purposes without the payment of royalties thereon or therefor.

The invention relates to a device for plotting ground profiles from a stereoscopic terrain model in photogrammetric mapping.

Exaggerated vertical profiles are often helpful in showing important geologic features, such as the correlation of rock formation in various locations. These have been usually constructed graphically from preexisting topographic maps by drawing a line in the desired direction, noting the elevation of the points of intersection with the contour lines, and drawing the corresponding profile. When topographical maps are not available, profiles can be run on the site by plane table traverse or a line of levels. In areas of steep inclination these methods of ground plotting are costly, and in rugged or inaccessible terrain may be impractical.

A 1:1 profile plotter has been described by Landen in "Photogrammetric Engineering" for December 1956, at pages 953–956. The present invention is an improvement thereover, in that exaggerated profiles having various exaggeration ratios may be constructed.

It is an object of this invention to provide a device for preparing an exaggerated profile at a constant scale from a stereoscopic terrain model.

It is an object of this invention to provide apparatus for automatically tracing out a vertical profile which the operator moves on indicating means along the ground level of an optical model.

Further objects will become apparent from the description of the invention given in the following disclosure and claims.

This invention consists of a lever arm having a pencil mounted at one end and pivotally connected at the other to the base of the tracing table supporting the platen on which an optical model of the terrain is projected stereoscopically. Between the pivot and the pencil, the lever is attached to the platen by a stud for rotational motion. As the platen is raised and lowered while keeping the floating mark in contact with the ground in the stereoscopic terrain model and moving along a desired profile line, the pencil end is correspondingly moved up and down. A vertical chart, suitably spaced with respect to the lever arm and parallel to the profile line, records the motion of the pencil across its surface. Varying the distance on the lever between the base pivot and the vertically movable stud alters the ratio of vertical movement of the pencil with respect to vertical movement of the platen.

In the drawing, Figure 1 is a perspective view of a device embodying the invention mounted in a conventional type stereoscopic plotter.

Figure 1:
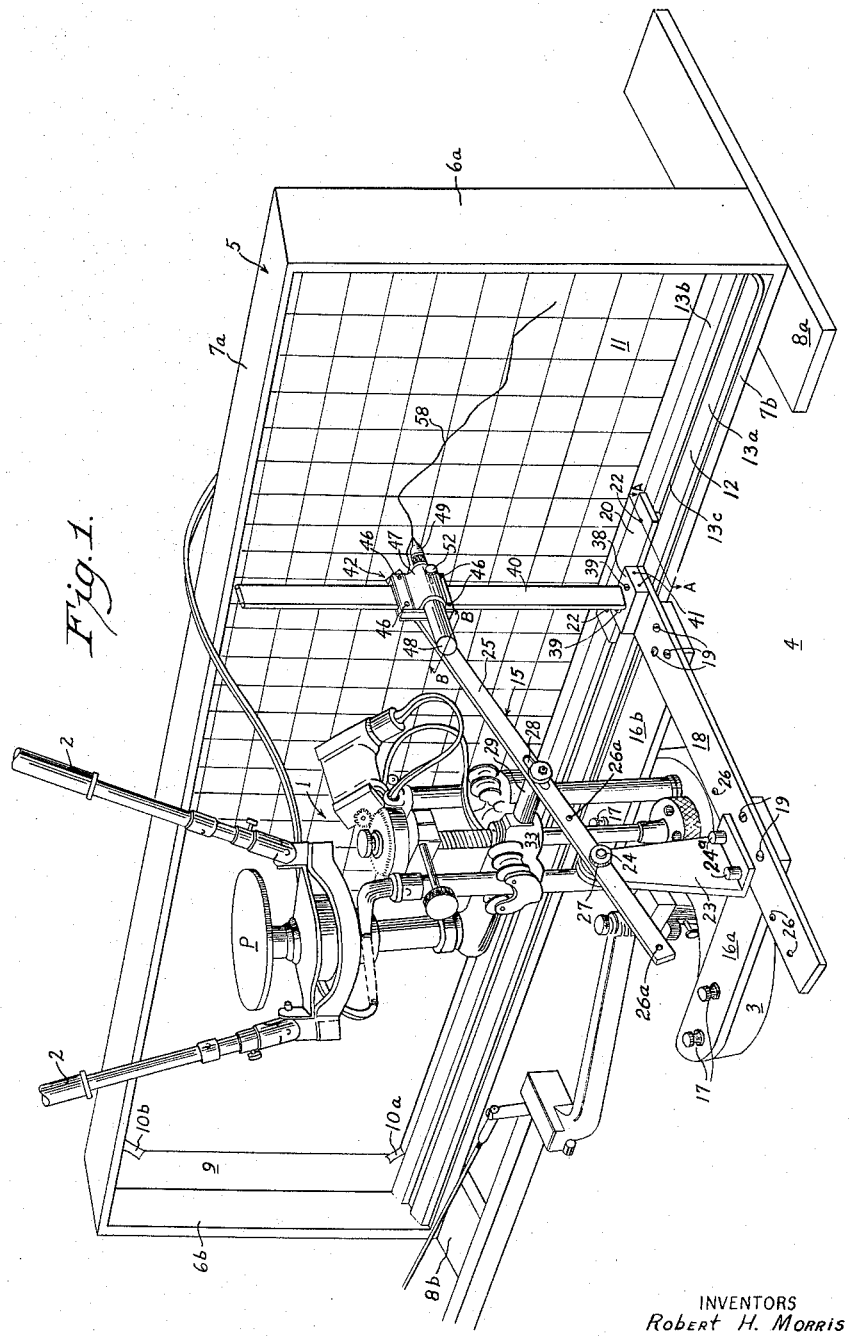

In Figure 1, conventional stereoscopic tracing table 1, such as disclosed in the patent to Kelsh, 2,492,870, having guide rods 2, platen P and base 3, is shown resting on map 4. Stationed vertically on map 4 is a frame 5, having two vertical sides 6a, 6b and upper and lower horizontal sides 7a, 7b. The vertical and horizontal sides are rigidly fastened together to form a rectangular framework. Horizontal legs 8a, 8b, attached to the ends of the lower horizontal member 7b form a base which support frame 5 vertically. Mounted in the framework is a flat, rigid backing member 9, which may be a suitably braced piece of plywood for example. Fastened to 9 by gummed tapes 10a, 10b, is a sheet of paper 11, which may be divided into squares, as in conventional graph paper. The lower horizontal frame element 7b has mounted thereon a track element 12, formed of two angle sections 13a, 13b, spaced by plate 14 (see Figure 2), with track 13c between the angle sections. Plate 14 is rigidly fastened to 7b and angles 13a and 13b by screws (not shown).

Figure 2:
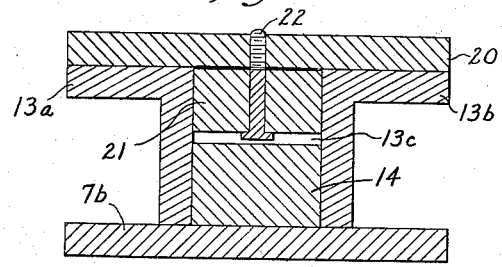
Figure 2 is a sectional view taken along line A—A in Figure 1.
Figure 3:
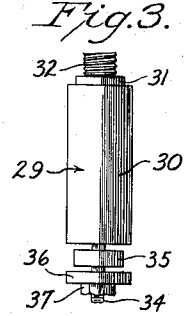
Figure 3 shows the pivot stud assembly in detail.

Attached to tracing table 1, as will be hereinafter set forth, is the lever arm assembly 15. This consists of two base arms 16a and 16b fastened to base 3 of table 1 by means of screws 17. Bar 18 is attached to base arms 16a and 16b by means of screws 19. It is apparent that the arms serve as rigid connecting means joining the base with bar 18. At one end of bar 18 and at right angles thereto is crossarm 20, so that 18 and 20 together form a T shaped member. As shown in Figure 2, a rolling bearing 21 is mounted on member 20 by screw 22, and rides in track 13c. Two such bearings are mounted on member 20, one near each end. Bar 18, arm 20 and associated members thus form a carriage assembly. Mounted on arm 18 by means of screws 24a fitting into holes 26 is fulcrum bar bracket 23. A plurality of properly spaced tapped holes 26 are provided, so that bar 23 may be located as desired along arm 18. Pivotally fastened to the upper portion of bar 23 by pin 24, is lever arm 25. Pin 24, which has an enlarged head at one end and is threaded at the other, passes through a hole at the upper end of bar 23 and one of holes 26a in arm 25. Knurled nut 27 is threaded on pin 24, and serves as a restraining member to keep arm 25 on the pin. At about the midsection of lever arm 25 is a slot, 28. Pivot stud 29, fastened to the tracing table and vertically movable therewith rides in slot 28. As shown in Figure 3, stud 29 consists of rod 30 having shoulder 31 and threaded shaft 32 at one end for attachment to boss 33 on the tracing table. Mounted at the other end of rod 30 is a shaft 34, threaded at its outer end, having a rolling bearing 35 mounted thereon, restrained by threaded washer 36 and nut 37. Bearing 35 fits into slot 28, as shown in Figure 1.

It is obvious from the description to this point, that vertical movement of the tracing table will cause the lever arm to pivot about pin 24, slot 28 being a lost motion device. Different ratios may be obtained by varying the spacing of the fulcrum bar 23 along arm 18, and at the same time, selecting the proper hole 26a for pin 24 in lever arm 25.

Attached to the end of arm 18 near track 13c, is supporting block 38 which is fastened to 18 by screws 39. A vertical standard 40, consisting of a flat rod having rounded edges, is mounted in a slot in block 38 and fastened rigidly therein by set screws 41.

Figure 4:
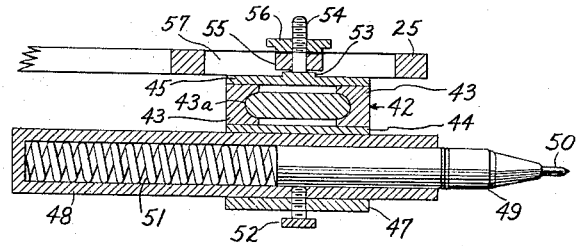
Figure 4 is a section along lines B—B in Figure 1, showing the pencil and sliding unit assembly, the pencil being shown in plan.

Hollow member 42 is formed by fastening two end plates 43, having semicylindrical grooves 43a, to side plates 44 and 45. The end plates and side plates are fastened together by screws 46. As shown in Figure 4, member 42 fits over standard 40, and is vertically movable thereon. Boss 47 on plate 44 has a cylindrical bore therein adapted to receive a cylinder 48, closed at one end. Chucked drafting pencil 49 having writing point 50 is mounted in cylinder 48 and is biased by spring 51. Set screw 52 mounted in 47 restrains movement of the pencil. Thus standard 40 serves as an upright, vertical guiding means for member 42, which in turn serves as a supporting means for drafting pencil 49.

Plate 45, as shown in Figure 4, has a shoulder 53 and a stud 54. Mounted on stud 54 is rolling bearing 55, which is restrained from lateral movement along shaft 54 by threaded and knurled nut 56. Bearing 55 moves in slot 57, which is near the end of lever arm 25. Slot 57 is similar to slot 28, except that it is somewhat longer in order to permit a greater longitudinal axial movement of the bearing member as the arm 25 pivots about member 24.

In operation, the horizontal direction of the desired profile line is determined on the optical model on the platen P of tracing table 1. A suitable vertical scale is selected by the spacing of fulcrum arm 23 relative to bar 18 and lever arm 25. The operator then places frame 5 so that drawing sheet 11 is parallel to the horizontal direction of the profile line, and point 50 of pencil 49 contacts the paper. The tracing table is moved in the direction of the profile line, being guided by track 13c and bearing wheel 21, while keeping the floating mark in contact with the ground surface in the optical model. This up-and-down motion is transmitted and multiplied by lever arm assembly 15, and is traced on sheet 11 by pencil 49, producing the exaggerated vertical profile 58.

This instrument is of value in studies relating to geological correlation problems, landslides, highway location (especially cut and fill calculations), reclamation questions (tunneling, gradient studies, etc.). In general, any study of terrain wherein exaggerated profiles are employed could use this instrument to advantage.

It is obvious that various substitutions and modifications may be made in the device without affecting the essence of the invention. For example, instead of slots in the lever arm wherein the bearing rotates, a suitable sliding crosshead may be substituted, which would enable the arm both to pivot and move axially. Other recording means could be substituted for the pencil and paper, such as a heated stylus on specially treated paper.

We claim:

1. A photogrammetric profile plotter for tracing a ground model comprising, tracing table means capable of vertical and horizontal movement to follow the apparent ground level of the stereoscopic model, a base adapted for horizontal movement, said tracing table means being mounted on said base, frame means having upper and lower edges and its plane parallel to the horizontal direction of the ground profile on the stereoscopic model, a vertical planar sheet mounted in said frame means, track means integral with said lower edge and parallel thereto, a first pivot means spaced from and rigidly connected with said base, a second pivot means mounted on the tracing table for vertical movement therewith, a lever arm means rotatably connecting the lever arm adjacent one end to the first pivot means, means connecting said lever arm to said second pivot means at a position spaced from said one end for both rotational movement about the latter and translational movement along the longitudinal axis of the lever arm, carriage means mounted in said track means for movement therein parallel to the horizontal direction of the ground profile, rigid means joining the carriage and said base, whereby the latter is constrained to travel in a direction parallel to the track means, upright guiding means mounted on said carriage means for motion therewith, whereby said guiding means can move in a direction parallel to the vertical planar sheet, supporting means mounted on the upright guiding means for up and down axial movement therein, pivot means integral with the supporting means, means connecting the other end of the lever arm with the latter pivot means for both rotational movement about said pivot means and for translational movement along the longitudinal axis of the lever arm, whereby the said other end of the lever arm is capable of up and down movement relative to the upright guiding means, and scribing means mounted on the supporting means, said scribing means contacting the vertical sheet for tracing thereon the horizontal and vertical movements of the tracing table means.

2. A photogrammetric profile plotter for tracing a ground profile along a given direction from a stereoscopic ground model comprising, tracing table means capable of vertical and horizontal movement to follow the apparent ground level of the stereoscopic model, a base adapted for horizontal movement, said tracing table means being mounted on said base, frame means having upper and lower edges, the plane of the frame means being parallel to the horizontal direction of the ground profile on the stereoscopic model, a vertical planar sheet mounted in said frame means, track means integral with said lower edge and parallel thereto, carriage means mounted in said track means for movement therein parallel to the horizontal direction of the ground profile, rigid connecting means joining the carriage means with the base means whereby the latter is constrained to travel in a direction parallel to the track means, upright guiding means mounted on said carriage means for motion therewith, whereby said guiding means can move in a direction parallel to the vertical planar sheet a bracket adjustably mounted on the said carriage means, a lever arm pivotally and adjustably connected near one end thereof to said bracket, said lever arm having a first longitudinal slot spaced from the said end, first pivot means mounted on the tracing table means for vertical movement therewith, means connecting said pivot means with the lever arm through the longitudinal slot whereby axial and rotational movement of the lever arm may be accommodated, the other end of the lever arm having a second longitudinal slot, supporting means mounted on the upright guiding means for up and down axial movement thereon, second pivot means connecting the supporting means with the lever arm through the second longitudinal slot whereby the said other end of the lever arm can move freely up and down the upright guiding means, scribing means mounted on the supporting means, said scribing means contacting the vertical sheet for tracing thereon the lever arm movements.

3. The profile plotter of claim 2, wherein the supporting means has therein a bore normal to the plane of the said planar sheet, the scribing means passing through the bore and being adjustably fastened to the supporting means, whereby the scribing means is maintained normal to the plane of the sheet.

References Cited in the file of this patent

UNITED STATES PATENTS

| 2,316,951 | Grauer | Apr. 20, 1943 |
| 2,636,271 | Valois | Apr. 28, 1953 |

FOREIGN PATENTS

| 16,065 | Germany | Nov. 26, 1881 |

OTHER REFERENCES

Landen: "A Photogrammetric Profile Plotter for Geological Use," Potogrammetric Engineering Magazine, vol. 22, pages 953–956, December 1956. (Copy in Scientific Library.)